United States Patent Office 3,223,722
Patented Dec. 14, 1965

3,223,722
1,2,5,6-TETRA(LOWER ALKYLSULFONYL) HEXITOLS
Tibor Horvath and Laszlo Vargha, Budapest, Hungary, assignors to Chinoin Gyógyszer- és Vegyészeti Termékek, Gyára, Budapest, Hungary
No Drawing. Filed Apr. 4, 1962, Ser. No. 184,921
5 Claims. (Cl. 260—456)

This invention is related to certain new chemical compounds of pharmecutical value and to methods of preparing the same. More particularly the invention is related to new alkylsulphonyl acid esters and methods for their preparation.

It is known that certain alkylsulphonic acid esters show inhibiting action on malignant tumors and related diseases. For instance 1,4-dimethanesulphonyl-1,4-butanediol is known as medicament for the treatment of myeloid leukaemia. The disadvantage of the compound is its insolubility in water. The effect of this product as inhibitor on the growth of tumors is negligible.

It is further known that different dimethanesulphonyl derivatives of sugar alcohols (see Nature, London, 182, 1146, 1958; Biochem. Pharmacol. 3, 247, 1960; Naturwiss. 46, 84, 1959) show more or less inhibiting action on the growth of tumors when applied in animal tests, their special advantage being their low toxicity along with their good solubility in water. The aqueous solutions are however rather instable.

It has been found according to the present invention that compounds of the formula

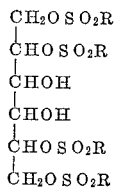

(where R stands for alkyl groups containing 1–5 carbon atoms) and acid addition salts thereof are valuable compounds, which show enhanced cytostatic activity over the compounds cited above, their indication field being larger while their solutions proved to be more stable. Thus e.g. 1,2,5,6 - tetramethanesulphonyl - D - mannitol inhibits the growth of the following kinds of tumors:

| | Degree of inhibition, percent |
|---|---|
| Guerin subc. carc. | 80 |
| Benevolenskaia subc. tumor | [1] 60 |
| Yoshida subc. carc. | 97 |
| Ehrlich ascites a carc. | 73 |
| S$_{57}$ subc. sarc. | [2] 75 |
| S$_{180}$ subc. sarc. | 50 |

[1] On rats.
[2] On mice.

The compounds may be administered in form of intravenous injections or they may be given in peroral doses.

It has been found further according to the present invention that the compounds of the above formula may be prepared advantageously and with good yields, when hexitols substituted with monoacetals or with acyl groups on the hydroxyl groups of positions 3 and 4 are reacted with alkylsulphonating agents, whereupon the acetal or diacyl groups are eliminated.

As starting material any hexitol may be used where the OH-groupings in position 3 and 4 are acetalized or diacylated. As acetal groupings with the 3- and 4-position OH groups the groups isopropylidene, benzylidene, methylene, ethylidene, cyclohexylidene are preferred. As acyl groups low chain carboxylic acids may be used preferably, such as e.g. acetic acid.

As alkylsulphonating agents alkylsulphonic acid halogenides containing 1–5 carbon atoms may be used e.g. methanesulphonic acid chloride, ethane sulphonic acid chloride, or anhydrides may be used, such as methane sulphonic acid anhydride, ethane sulphonic acid anhydride. The reaction is brought about preferably in alkaline medium, e.g. in presence of pyridine. In order to eliminate the acetal and acyl groups from the hexitol strong acids may be used, such as hydrogen halogenides. When benzal or substituted benzal groups were used for protecting the 3 and 4 position hydroxyls the acetal may be removed also by reduction. The reduction is carried out in a polar solvent, preferably in an alcohol e.g. methanol.

More details of the invention are to be found in the examples.

Example 1

66.6 g. 3,4-monoacetono-D-mannitol are dissolved in 360 ml. of anhydrous pyridine whereupon 172 ml. of methano-sulphochloride are added while stirring and cooling. The reaction mixture is then stirred for an hour at 10° C. and finally some hours at room temperature. On pouring on ice the product precipitates oily but turns into a solid and crystallises finally on scrubbing and kneading several times with fresh water. After decanting the water from the product 800 ml. of ethylacetate are added to the product and the product is then filtered, washed with ethylacetate, methanol and water. The weight of the product amounts to 106 g. M.P.: 128–130° C. The aqueous ethylacetate layer is separated in a funnel and the ethylacetate solution is extracted several times with water. The solvent is evaporated in vacuo leaving a residue which crystallizes when cold. Filtrated and washed with water and ethanol 47.9 g. of the product are obtained. M.P.: 125–129° C. The united fractions of the product are dissolved hot in dioxane, decolourized with charcoal, filtered and hot methanol is added to the filtrate. On cooling a crystalline product precipitates yielding after isolation 133 g. of 1,2,5,6-tetramethanesulphonyl-3,4-monoacetono-D-mannitol. M.P. 132–133° C.; $(\alpha)_D^{20}=+24.5$ (in dioxane). The results of elementary analysis of the product correspond with the assumed formula.

Dissolved in warm dioxane the product may be precipitated partlry when anhydrous methanol containing hydrochloric acid is added. Boiling the reaction mixture until completely dissolved and evaporating the solvent under mild conditions the residue yields 116.2 g. of a product which is recrystallized from ethylacetate to give 108.7 g. 1,2,5,6-tetramethanesulphonyl-D-mannitol-hydrochloride, melting at 89–91° C. Without water of crystallization the melting point of the product rises to 114.5–115° C.; $(\alpha)_D^{20}=4.97$ (in dioxane).

Example 2

44.4 g. 3,4-monoacetono-D-sorbitol are dissolved in anhydrous pyridine and then reacted with 115 g. of methanesulphonyl-chloride according to the method described in Example 1. The product is dissolved after precipitation in chloroform, this solution yielding after washing, drying and evaporating 106 g. of 1,2,5,6-tetramethanesulphonyl-3,4-monoacetono-D-sorbitol in the form of a colourless gum, the analytical data of which correspond to the values calculated for the formula.

Dissolved in 1000 ml. of chloroform and treated with aqueous methanol containing 2% of hydrochloric acid the solvent is evaporated in vacuo after standing for some days. The product is recovered from the residue finally in crystalline form (66.4 g.). Recrystallized from ethyl acetate 52.9 g. of 1,2,5,6-tetramethanesulphonyl-D-sorbittol are obtained melting at 126–127° C.; $(\alpha)_D^{20}=-12.78°$ (in acetonitrile).

What we claim is:
1. A compound selected from the group consisting of compounds of the formula

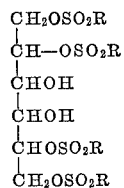

wherein R is alkyl having 1 to 5 carbon atoms; and acid addition salts thereof.

2. A compound having the formula

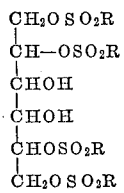

wherein R is an alkyl containing from about 1 to 5 carbon atoms.

3. 1,2,5,6-tetramethanesulphonyl - D - mannitol hydrochloride.
4. 1,2,5,6-tetramethanesulphonyl-D-mannitol.
5. 1,2,5,6-tetramethanesulphonyl-D-sorbitol.

References Cited by the Examiner

UNITED STATES PATENTS 2,816,125  12/1957  Allen et al. _____ 260—456
2,917,502  12/1959  Schwyzer et al. _____ 260—112

FOREIGN PATENTS 217,994  11/1961  Australia.
891,466  3/1962  Great Britain.
43,631  2/1961  Poland.

OTHER REFERENCES

Bergel: Brit. Med. J. No. 5249, pp. 399–403 (1961).
Brown et al.: J. Chem. Soc. (London), vol. of 1961, pp. 3656–3664.
Haddow et al.: Nature, vol. 182, pp. 1164–1165 (1958).
Muller: Ber. Deut. Chem., vol. 65, pp. 1051–1055 (1952).

CHARLES B. PARKER, *Primary Examiner.*